United States Patent Office 3,246,027
Patented Apr. 12, 1966

3,246,027
PROCESS FOR CONVERTING CIS-1,2-DICYANOCYCLOBUTANE TO TRANS-1,2-DICYANOCYCLOBUTANE
Ralph Courtenay Schreyer, Wilmington, Del., assignor to E. I. du Pont de Nemours and Company, Wilmington, Del., a corporation of Delaware
No Drawing. Original application Mar. 22, 1961, Ser. No. 97,454, now Patent No. 3,192,262, dated June 29, 1965. Divided and this application June 3, 1964, Ser. No. 372,379
4 Claims. (Cl. 260—464)

This application is a division of my copending application, U.S. Serial Number 97,454, filed March 22, 1961, now U.S. Patent 3,192,262, patented June 29, 1965.

This invention relates to a process for converting the cis-isomer of 1,2-dicyanocyclobutane into the trans-isomer.

It has been discovered that 1,2-dicyanocyclobutane can be hydrogenated in the presence of ammonia and in the liquid phase, under at least about 100 atmospheres of hydrogen, and preferably under from about 400 to about 1000 atmospheres of hydrogen, over a hydrogenation catalyst, comprising a transition metal of Group VIII of the Periodic Table of Elements, and at a temperature in the range of 75° to 250° C. to give trans-1,2-bis(aminomethyl)cyclobutane and 3-aza(3.2.0)bicycloheptane.

It has also been discovered that the preferred conditions for the preparation of trans-1,2-bis(aminomethyl)-cyclobutane in high yield require the use of trans-1,2-dicyanocyclobutane as the starting material with the hydrogenation being carried out at as low a temperature as will give an economic rate of reaction, usually a temperature in the range of 75° to about 150° C. It has been found that trans-1,2-bis(aminomethyl)cyclobutane can be converted into a series of novel and useful polycarboxylamides by polymerization with dicarboxylic acids or their amide-forming derivatives.

The starting material, 1,2-dicyanocyclobutane, can be prepared by a process which involves the thermal dimerization of acrylonitrile. This preparation was first described by Coyner and Hillman, J. Amer. Chem. Soc., 71, p. 324 (1949). However, the conditions of reaction described by Coyner and Hillman resulted in considerable loss to tarry, resinous polymeric byproducts. A much improved process for the dimerization of acrylonitrile to 1,2-dicyanocyclobutane is described in an application, Serial Number 857,557, filed December 7, 1959, by William L. Lehn and George R. Nacci, now abandoned.

It is known that these processes for the dimerization of acrylonitrile yield a mixture of the cis- and trans-geometric isomers of 1,2-dicyanocyclobutane. These isomers can be separated by fractional distillation into two fractions which, after recrystallization, have boiling points, under 6 mm. pressure, of 123° C. and 165° C., respectively. Both pure isomers are solids; after recrystallization from ether-ethanol, the melting point of the lower-boiling isomer is 37–38° C. and the melting point of the higher boiling isomer is 72–73° C. According to the rule of von Auwers-Skita (see "Steric Effects in Organic Chemistry," Ed. M. S. Newman, page 20, John Wiley & Sons, Inc., New York), the higher boiling and higher melting isomer should have the cis-configuration. This assignment was confirmed by measurement of the dipole moments: the dipole moment of the low-melting isomer (trans-form) is 4.3 Debyes and the dipole moment of the high-melting isomer (cis-form) is 6.0 Debyes.

Since the preferred process for the production of trans-1,2-bis(aminomethyl)cyclobutane requires the use of trans-1,2-dicyanocyclobutane as the starting material, an aspect of the present invention is the discovery of a process for converting cis-1,2-dicyanocyclobutane to trans-1,2-dicyanocyclobutane. In accord with this aspect of the invention, it has been discovered that nickel or cobalt hydrogenation catalysts will isomerize the cis-isomer to the trans-isomer at temperatures in the range of about 150° to 350° C. While isomerization does occur in the liquid phase under these conditions, it is preferable for high conversion and recovery, to employ a vapor phase isomerization step at 250° to 350° C. A mixture consisting of the cis- and trans-isomeric, 1,2-dicyanocyclobutanes, usually with the cis-isomer present in at least 50%, is vaporized and passed continuously over a bed of a cobalt or nickel hydrogenation catalyst at a temperature in the range of 150° to 350° C., preferably in the range of 250° to 350° C. It is essential that no molecular hydrogen be present in this vapor phase process. The effluent is separated into the cis- and trans-isomers by fractional distillation, and the trans-isomer is then hydrogenated in the liquid phase in accordance with the process of this invention while the cis-isomer is recirculated to the vapor phase isomerization step.

Hydrogenation catalysts which have been found operable for the isomerization of cis-1,2-dicyanocyclobutane to trans-1,2-dicyanocyclobutane as well as for the conversion of 1,2-dicyanocyclobutane to trans-1,2-bis(aminomethyl)cyclobutane comprise Raney nickel and Raney cobalt, and the reduced oxides of the transition elements of Group VIII of the Periodic Table, e.g., reduced nickel oxide and reduced cobalt oxide. Cobalt and nickel are the preferred catalysts since they are particularly effective in isomerizing cis-1,2-dicyanocyclobutane to the trans-isomer. These catalysts may be supported on silica, alumina, or carbon, or they may be prepared by reduction of the pure metal oxides or salts. Whether supported or unsupported, these Group VIII reduced metal catalysts are activated by hydrogenation prior to use. Also effective are the molybdites with Group VIII metal cations, particularly cobalt or nickel molybdite.

While, as indicated hereinabove, the preferred process for the production of trans-1,2-bis(aminomethyl)cyclobutane employs the trans-1,2-dicyanocyclobutane isomer as starting material, the mixture of isomers as obtained from the dimerization of acrylonitrile is also suitable. When the mixture is employed, there is obtained as a byproduct a novel secondary amine, 3-aza(3.2.0)bicycloheptane; no evidence is found for the presence of any of the theoretically-possible cis-1,2-(aminomethyl)cyclobutane, so it is believed that this isomer is completely converted to 3-aza(3.2.0)bicycloheptane under the conditions of the reaction.

Therefore, the reactions occurring in the process of this invention can be indicated by the following equations:

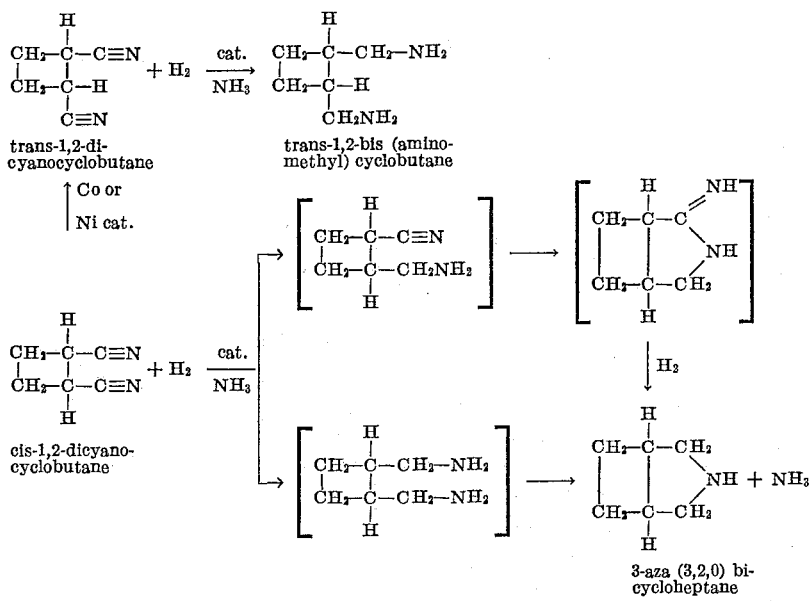

It is not certain by which route 3-aza(3.2.0)bicycloheptane is formed, so alternative routes are indicated in the equations.

It has been found that when the liquid phase hydrogenation of mixtures of cis- and trans-1,2-dicyanobutane is carried out in the presence of cobalt or nickel catalysts, the proportion of diamine to bicyclic secondary amine obtained may be greater than would be predicted from the proportion of trans-isomer in the starting material.

Therefore, some isomerization does occur in the liquid phase under these conditions. In view of this, it is surprising that adiponitrile is not a major product under these conditions since, as disclosed in my application, Serial Number 36,702, filed June 17, 1960, now U.S. Patent 3,092,654, issued June 4, 1963, similar catalysts convert 1,2-dicyanocyclobutanes exclusively to adiponitrile when hydrogenation is carried out in the vapor phase; under those conditions, ring scission and hydrogenation of the resulting free radicals occur preferentially to reduction of the nitrile groups.

The following examples are provided to illustrate the invention but it is not intended to limit the invention thereto, since it is obvious that many variations embraced by the above descriptions of the invention are possible and will occur to one skilled in the art of hydrogenation. In these examples, parts are by weight unless otherwise indicated:

EXAMPLE 1

Thirty parts of a mixture consisting of the crude acrylonitrile dimer obtained from thermal dimerization of acrylonitrile (a mixture of cis-1,2-dicyanocyclobutane and trans-1,2-dicyanocyclobutane containing approximately 40% cis-isomer and 60% trans-isomer), 85 parts anhydrous ammonia, and 5 parts of a Raney nickel catalyst were charged to a high-pressure steel shaker tube and processed for one hour at 150° C. under hydrogen at a pressure of 600 atmospheres.

The shaker tube was cooled, the pressure vented, and the contents discharged, the tube was rinsed with methanol. Catalyst was removed by filtration. The product mixture comprised trans-1,2-bis(aminomethyl)cyclobutane, and 3-aza(3.2.0)bicycloheptane, together with methanol wash. The latter was separated by distillation. The reaction products were separated by crude fractional distillation at 1 mm. pressure, and 17 parts of the crude diamine was obtained as well as a fraction comprising 3-aza(3.2.0)bicycloheptane. This latter product has a boiling point of 127–130° C./atmospheric pressure; $n_D^{27}=1.4530$. The crude trans-1,2-bis(aminomethyl)cyclobutane boiled at 50–65° C./1 mm. Hg. This was refined by atmospheric pressure distillation in a three-foot, platinum, spinning-band column yielding 8 parts of center cut having a boiling point of 193–193.5° C./atmospheric pressure; $n_D^{27.5}=1.4778$. This product was subjected to elemental analysis and to determination of its neutral equivalent with the following results:

|  | Calculated | Found |
|---|---|---|
| Percent C | 63.1 | 63.7; 63.86. |
| Percent H | 12.29 | 12.30; 12.55. |
| Percent N | 24.56 | 24.13. |
| Neutral Eq | 57 | 56; 56. |

A repetition of the above experiment in which the Raney nickel catalyst was replaced by a Raney cobalt catalyst gave substantially equivalent products.

EXAMPLE 2

A catalyst was prepared by reducing 50 cc. of cobalt oxide in a reaction tube by passing hydrogen at 300° C. over it for several hours. The hydrogen was displaced with nitrogen. Then a feed consisting of 72% cis- and 28% trans-1,2-dicyanocyclobutane was vaporized and passed through the tube with $N_2$ gas as carrier at a rate to give about 5 seconds contact time. Three temperature ranges were tried. The effluent was condensed and subsequently analyzed by gas chromatography. Results are shown in Table A.

Table A

ISOMERIZATION OF CIS- TO TRANS-1,2-DICYANOCYCLOBUTANE

| Temp., ° C. | Cc.$N_2$/min. | Percent Recovery | Percent Trans- | Percent Cis- | Percent Low Boilers |
|---|---|---|---|---|---|
| 269–300 | 500 | 50 | 85 | 14 | 0.6 |
| 285–319 | 500 | 63 | 85 | 15 | 0.2 |
| 294–342 | 500 | 35 | 85 | 14 | 1.4 |

Similar results were achieved in another experiment with a reduced nickel oxide catalyst.

EXAMPLE 3

A stirred, stainless steel autoclave equipped for continuous addition and removal of liquid was charged with a cobalt catalyst prepared as described in Example 2 and with trans-1,2-dicyanocyclobutane prepared as described in Example 2. The autoclave was pressured to 600 atmospheres with hydrogen and the contents stirred and heated to, and maintained at, 125° to 150° C. Trans-1,2-dicyanocyclobutane together with about 5 parts ammonia to one part of trans-1,2-dicyanocyclobutane were continuously added and product stream removed at such a rate as to provide a 30-minute average contact time.

The liquid effluent was separated by fractional distillation to recover the lower-boiling fraction, and the higher-boiling residue, unreacted trans-1,2-dicyanocyclobutane was recycled to the autoclave. The lower-boiling fraction consisted essentially of only trans-1,2-bis(aminomethyl)cyclobutane which was further refined by distillation.

In another experiment, similar results were achieved using a reduced nickel oxide catalyst for the hydrogenation.

The polycarboxylamides obtained from trans-1,2-bis(aminomethyl)cyclobutane by condensation polymerization with dicarboxylic acids are useful for the preparation of textile fibers, both mono-filaments and yarns. They can be employed as molding granules for the fabrication of shaped articles by extrusion and by injection molding. Fibers, tubing, and pipe are examples of useful articles which can be made by extrusion of these polyamides. Gears, housings, containers, door handles and the like can be made from these polyamides by injection molding. These polyamides are more transparent than many of the nylons previously known to commerce, making them unique in applications where transparency is desired, particularly in films and containers. Because of their optical properties, they can be pigmented or dyed to provide brilliant colored plastic articles.

I claim:

1. A process for the isomerization of cis-1,2-dicyanocyclobutane to trans-1,2-dicyanocyclobutane from a mixture of said compounds wherein the cis-isomer is present in at least 50% which consists essentially of contacting said mixture in the vapor phase at a temperature in the range of 250° to 350° C. in an inert atmosphere which is maintained substantially free from molecular hydrogen with a catalyst selected from the group consisting of Raney nickel, Raney cobalt, reduced nickel oxide, reduced cobalt oxide, reduced nickel molybdite and reduced cobalt molybdite.

2. A process according to claim 1 in which the catalyst is selected from reduced nickel oxide and reduced cobalt oxide.

3. A process according to claim 1 in which the catalyst is selected from reduced nickel molybdite and reduced cobalt molybdite.

4. A process according to claim 1 in which the catalyst is selected from Raney nickel and Raney cobalt.

References Cited by the Examiner
UNITED STATES PATENTS

| | | | |
|---|---|---|---|
| 3,092,654 | 6/1963 | Schreyer | 260—464 X |
| 3,096,360 | 7/1963 | Sennewald et al. | 260—464 |
| 3,099,690 | 7/1963 | Sennewald et al. | 260—464 |

CHARLES B. PARKER, *Primary Examiner.*

JOSEPH P. BRUST, *Assistant Examiner.*

UNITED STATES PATENT OFFICE
CERTIFICATE OF CORRECTION

Patent No. 3,246,027　　　　　　　　　　　　　　　April 12, 1966

Ralph Courtenay Schreyer

It is hereby certified that error appears in the above numbered patent requiring correction and that the said Letters Patent should read as corrected below.

Columns 3 and 4, after the last equation, for "3-aza (3,2,0) bicycloheptane" read -- 3-aza (3.2.0) bicycloheptane --; column 4, Table A, last column, line 2 thereof, for "0.2" read -- 0.4 --; same table, same column, line 3 thereof, for "1.4" read -- 1.2 --. column 6, line 27, for "3,099,690" read -- 3,099,680 --.

Signed and sealed this 19th day of July 1966.

(SEAL)
Attest:

ERNEST W. SWIDER
Attesting Officer

EDWARD J. BRENNER
Commissioner of Patents